US010522166B2

(12) United States Patent
Tsingos

(10) Patent No.: US 10,522,166 B2
(45) Date of Patent: Dec. 31, 2019

(54) MODELING AND REDUCTION OF DRONE PROPULSION SYSTEM NOISE

(71) Applicant: Dolby Laboratories Licensing Corporation, San Francisco, CA (US)

(72) Inventor: Nicolas R. Tsingos, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/544,074

(22) PCT Filed: Jan. 20, 2016

(86) PCT No.: PCT/US2016/014127
§ 371 (c)(1),
(2) Date: Jul. 17, 2017

(87) PCT Pub. No.: WO2016/118626
PCT Pub. Date: Jul. 28, 2016

(65) Prior Publication Data
US 2018/0005643 A1    Jan. 4, 2018

Related U.S. Application Data

(60) Provisional application No. 62/105,643, filed on Jan. 20, 2015.

(51) Int. Cl.
*G10K 11/16* (2006.01)
*G10L 21/0216* (2013.01)
(Continued)

(52) U.S. Cl.
CPC ...... *G10L 21/0216* (2013.01); *G10L 21/0208* (2013.01); *G10L 21/0232* (2013.01);
(Continued)

(58) Field of Classification Search
CPC ............ B64C 2220/00; B64C 2201/00; B64C 2220/04; B64C 2220/042;
(Continued)

(56) References Cited

U.S. PATENT DOCUMENTS 5,375,174 A * 12/1994 Denenberg ........... G10K 11/178
381/71.6
6,438,513 B1 * 8/2002 Pastor ................. G10L 21/0208
702/191
(Continued)

FOREIGN PATENT DOCUMENTS

KR            101363066            2/2014

OTHER PUBLICATIONS

Yoon, et al, "Advanced Sound Capturing Method with Adaptive Noise Reduction System for Broadcasting Multicopters", 2015 IEEE International Conference on Consumer Electronics ICCE, Jan. 9-12, 2015, p. 26-29.*
(Continued)

*Primary Examiner* — Leshui Zhang

(57) ABSTRACT

In some embodiments, a method, apparatus and computer program for reducing noise from an audio signal captured by a drone (e.g., canceling the noise signature of a drone from the audio signal) using a model of noise emitted by the drone's propulsion system set, where the propulsion system set includes one or more propulsion systems, each of the propulsion systems including an electric motor, and wherein the noise reduction is performed in response to voltage data indicative of instantaneous voltage supplied to each electric motor of the propulsion system set. In some other embodiments, a method, apparatus and computer program for generating a noise model by determining the noise signature of at least one drone based upon a database of noise signals corresponding to at least one propulsion system and cancel-
(Continued)

ing the noise signature of the drone in an audio signal based upon the noise model.

20 Claims, 2 Drawing Sheets

(51) Int. Cl.
*G10L 21/0232* (2013.01)
*G10L 21/0208* (2013.01)
*B64C 39/02* (2006.01)

(52) U.S. Cl.
CPC ...... *B64C 39/024* (2013.01); *B64C 2201/027* (2013.01); *B64C 2220/00* (2013.01); *G10L 2021/02085* (2013.01); *G10L 2021/02166* (2013.01)

(58) Field of Classification Search
CPC .......... B64C 2220/044; B64C 2220/16; B64C 2220/206; H04R 1/02; H04R 3/00; H04R 5/00; H04R 5/02; H04R 5/023; H04R 5/005; H04R 5/033; H04R 29/00–008; H04R 27/00; H04R 3/005; H04R 3/02; H04R 3/12; H04R 2227/003; H04R 2420/03; H04R 2420/05; H04R 2430/01; H04R 2203/00; H04R 3/002; H04R 3/007; H04R 3/04; H04R 3/06; H04R 3/08; H04R 3/10; H04R 3/14; H04S 1/002; H04S 1/005; H04S 7/00; H04S 7/30; H03G 3/32; H03G 3/00; H03G 3/20; H03G 3/3005; H03G 3/3089; H03G 3/005; G10H 1/16
USPC ........... 381/13, 66, 315, 317, 318, 320, 321, 381/71.1–71.14, 73.1, 86, 91, 92, 93, 381/94.1–94.9, 95, 97, 98, 99, 100, 101, 381/102, 103, 106, 111, 112, 113, 114, 381/115, 119, 122, 56, 57, 58, 59, 61; 704/9, 270, E19.01, E19.013, E19.024, 704/E19.025, E21.011; 379/88.01, 88.02, 379/88.04–88.08, 88.16, 88.18; 455/63.1, 455/63.2, 63.3, 63.4, 64, 66.1, 67.11, 455/67.13, 67.7, 114.2, 114.3, 135, 221, 455/222, 223, 226.3, 277.2, 278.1, 283, 455/296, 297, 298, 299, 303, 304, 305, 455/306, 307, 308, 309, 310, 312; 700/94
See application file for complete search history.

(56) References Cited

U.S. PATENT DOCUMENTS

| | | |
|---|---|---|
| 2003/0179888 A1 | 9/2003 | Burnett |
| 2008/0212819 A1* | 9/2008 | Cerwin ............... H04R 1/086 381/359 |
| 2010/0017114 A1 | 1/2010 | Tehan |
| 2014/0079234 A1 | 3/2014 | Butts |
| 2014/0094973 A1 | 4/2014 | Giaimo, III |
| 2014/0277930 A1 | 9/2014 | Pan |
| 2014/0286497 A1 | 9/2014 | Thyssen |
| 2016/0137304 A1* | 5/2016 | Phan ................... B64D 27/02 244/17.23 |

OTHER PUBLICATIONS

Parrot, "User Guide—AR. Drone 2.0" (Year: 2012).*
Khan A. et al., "Parameter Optimization for Audible Noise Reduction in High Frequency Injection Based Low Speed Sensorless Control of PM Machines", American Society of Naval Engineers (ASNE) Electric Machines Technology Symposium, Philadelphia PA, p. 1-9, May 19-20, 2010.
Yoon S. et al., "Advanced sound capturing method with adaptive noise reduction system for broadcasting multicopters", 2015 IEEE International Conference on Consumer Electronics (ICCE), IEEE, pp. 26-29, XP032749817, Jan. 9, 2015.
Takahiro I. et al., "Design model of microphone arrays for multirotor helicopters", 2015 IEEE/RSJ International Conference on Intelligent Robots and Systems (IROS), IEEE, pp. 6143-6148, XP032832473, Sep. 28, 2015.
Klapel J., "Acoustic Measurements with a Quadcopter Embedded System Implementations for Recording Audio from Above", XP055241130, Jun. 1, 2014.
Ephraim Y. et al., "Speech Enhancement Using a Minimum Mean-Square Error Short-Time Spectral Amplitude Estimator", IEEE Trans. on Acoustics, Speech and Signal, No. 6 vol. ASSP-32, pp. 1109-1121, Dec. 1984.
Drone Work Rally Portugal the New View on the Sport, 2013 (video) http://www.dailymotion.com/video/xzjob7_drone-work-rally-portugal-the-new-view-on-the-sport-2013_sport.
Feltman R., "The Future of Sports Photography: Drones", Feb. 18, 2014. http://www.theatlantic.com/technology/archive/2014/02/the-future-of-sports-photography-drones/283896/.
Beckham J., "Drones Will Transform Sports Photography—Once the FAA Gets Out of the Way", Sep. 23, 2014. http://www.wired.com/2014/09/drones-will-transform-sports-photographyonce-faa-gets-way/.
AP, "New use for drones: Sports photography", Sep. 22, 2012. http://www.cbsnews.com/news/new-use-for-drones-sports-photography/.
Collins K., "Pro snowboarder creates autonomous camera drone Hexo+", Oct. 29, 2014. http://www.wired.co.uk/news/archive/2014-10/29/hexo-plus-autonomous-flying-camera.

* cited by examiner

MODELING AND REDUCTION OF DRONE PROPULSION SYSTEM NOISE

CROSS-REFERENCE TO RELATED APPLICATIONS

This application is a national stage and claims the benefit of priority to International Patent Application No. PCT/US2016/014127 filed on 20 Jan. 2016, which claims the benefit of priority to U.S. Provisional Patent Application No. 62/105,643 filed 20 Jan. 2015, the contents of which are hereby incorporated by reference.

FIELD OF THE DISCLOSURE

The present disclosure relates generally to modeling of noise emitted by drone propulsion systems and use of the resulting modeled noise to perform noise reduction on audio signals captured by one or more microphones on a drone. Some embodiments pertain to modeling of noise emitted by a drone propulsion system (including an electric motor) as a function of voltage supplied to the motor, and use of the resulting modeled noise to perform noise reduction on an audio signal (e.g., a recorded version of such a signal) captured by one or more microphones on a drone.

BACKGROUND

The use of drones and unmanned aerial vehicles (UAVs) or unmanned aerial systems (UASs) [hereinafter collectively referred to as "drones"] in the production of movies, televisions and other multimedia productions is becoming widespread. To some degree this increased usage has occurred due to the Federal Aviation Administration's recent decision to allow the operations of drone for the purpose of scripted, closed-set filming for the motion picture and television industry. It may be possible to apply for an exemption from the FAA's regulations to allow the use of drone in recording or live streaming of sporting events. Other countries may also require governmental approval of the use of drones.

Drones are commonly used to record video but are generally impractical to record audio due to the high noise levels generated by their propulsions systems (e.g., motors and propellers). The ability to record audio from a variety of drone platforms could provide improved flexibility for dialog recording or multichannel reconfigurable microphone arrays.

It is also contemplated that drones may at some point in the future be employed in various retail stores as well as the workplace such as warehouses and the factory floor. In such environments, the drones maybe required to have the capability of receiving voice commands to control the unmanned vehicles. For example, a voice command may be required as a safety feature (e.g., kill switch). The high noise levels generated by the drone's propulsions systems could likely drown out any voice command.

Accordingly, there is a need for a method, apparatus and computer systems to reduce (e.g., cancel) the noise emanating from a drone's propulsion system and captured by the onboard microphone set (e.g., one onboard microphone) during an audio recording, live streaming events or capture of other audio input(s).

SUMMARY

Example embodiments disclosed herein describe one or more methods for performing noise reduction on audio captured by a drone having a propulsion system set and a microphone set. The propulsion system set may include at least one propulsion system, where each propulsion system includes an electric motor, and the microphone set includes at least one microphone. The method may include the steps of: (a) providing voltage data indicative of instantaneous voltage supplied to each electric motor of the propulsion system set and (b) in response to the voltage data, using modeled noise to perform noise reduction on an audio signal captured by the microphone set of the drone, where the modeled noise is determined by a model of noise emitted by the propulsion system set as a function of instantaneous voltage supplied to each motor of the propulsion system set. In some example embodiments, the method includes the steps of providing (e.g., generating and recording) noise data, where the noise data is indicative of noise emitted by at least one drone propulsion system including an electric motor, as a function of voltage supplied to the electric motor, and generating the model of noise in response to the noise data. In some example embodiments, step (a) includes the steps of receiving at a processing system at least one signal indicative of the voltage data (e.g., where said at least one signal has been transmitted via a wireless link from the drone to the processing system), and parsing the at least one signal to identify the voltage data.

Typically, the drone is configured to transmit (e.g., includes a wireless transmission subsystem configured to transmit to a remotely located processing system) an audio signal captured by the microphone set (e.g., a noisy audio signal indicative of audio of interest and propulsion system noise), and a propulsion voltage signal indicative of the voltage data indicative of the voltages instantaneously being supplied to each motor of the propulsion system set. The processing system is configured to perform noise reduction on the audio signal using a predetermined noise model, in response to the propulsion voltage signal. In some example embodiments, the propulsion voltage signal is one channel of a multichannel signal which includes at least one other channel indicative of the audio signal.

In some example embodiments, the drone includes a noise reduction subsystem, and is configured to generate an audio signal captured by the microphone set, and to generate (and provide to the noise reduction subsystem) the voltage data indicative of the voltages instantaneously being supplied to each motor of the propulsion system set. The noise reduction subsystem is configured to perform noise reduction on the audio signal using a predetermined noise model in response to the voltage data, thereby generating a noise-reduced audio signal. The drone is configured to transmit the noise-reduced audio signal to a remotely located receiver.

Some example embodiments generate a parametric model of noise, including by: (a) providing (e.g., generating and recording) noise data indicative of noise (e.g., motor plus propeller noise) emitted by at least one drone propulsion system including an electric motor, as a function of voltage supplied to the electric motor, and (b) generating the parametric model of noise in response to the noise data, such that the parametric model is indicative of noise emitted by each drone propulsion system as a function of voltage supplied to the electric motor of the drone propulsion system. In some such embodiments, the noise data is (e.g., is a recorded database which is) indicative of noise signals emitted from at least one drone propulsion system (including a motor and at least one propeller), and typically from each of a number of different drone propulsion systems (e.g., drone propulsion systems of different model types). In some embodiments, the noise data is indicative of a set of noise signals emitted from a drone propulsion system, where each of the noise signals is indicative of noise emitted from the propulsion system while the motor of the propulsion system is driven by a different voltage of a set of voltages (e.g., a set of voltages which span a full range of voltages which may supplied to the motor, to drive the motor, during drone operation), and at least one of the noise signals corresponds to each of the voltages in the set. The parametric noise model generated in step (b) may include a parametric model of each of the noise signals, and may be indicative of harmonic spectral components (and optionally also an expression of non-harmonic spectral components) of the model of each of the noise signals.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate example embodiments disclosed herein and explain various principles and advantages of those embodiments.

Figure 1:
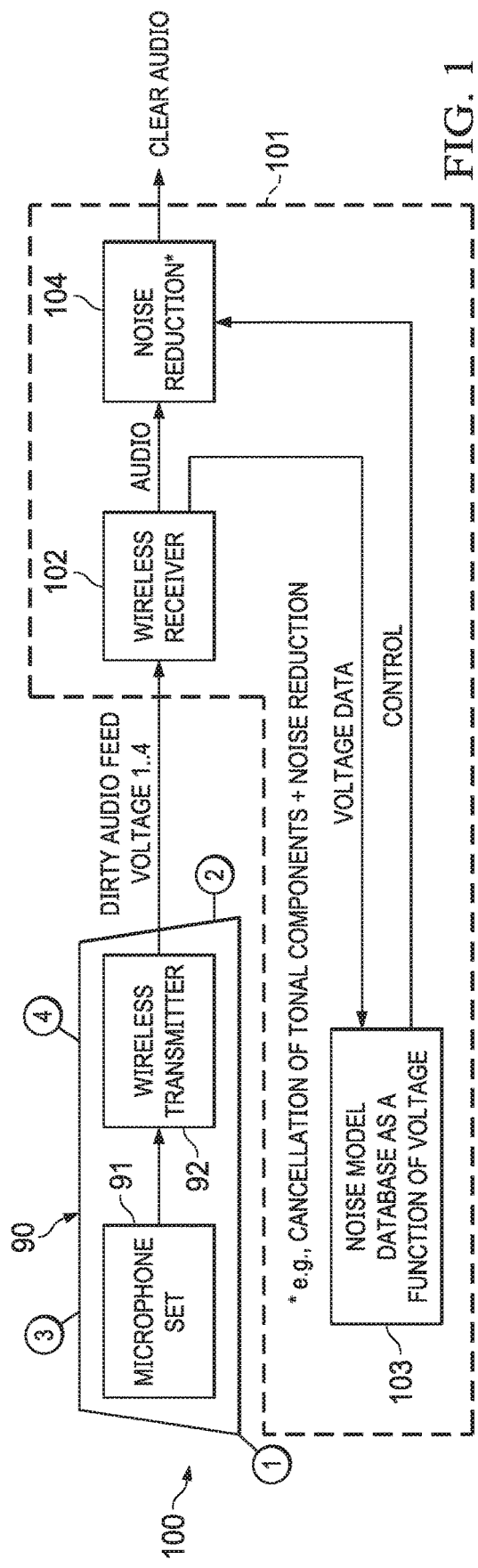
FIG. 1 illustrates a system for modeling noise emanating from a drone's propulsion systems (e.g., motors and propellers) and performing noise reduction (e.g., to cancel the noise) on audio captured by the drone, in accordance with some example embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the example embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Disclosed is a method, apparatus and computer program for generating a noise model by determining the noise signature of at least one drone propulsion system (e.g., all drone propulsion systems) of a drone based upon a database of noise emitted by the propulsion system(s) and captured by at least one microphone, and using the resulting modeled noise to perform noise reduction (e.g., noise cancellation) on a noisy audio signal (e.g., a recorded versions of such a signal) captured by one or more microphones on a drone.

Typically, the noise model is or includes a model of noise emitted by each propulsion system of the drone as driven by each voltage in a range of voltages, and the noise reduction is performed using the noise model and in response to data indicative of the voltage(s) instantaneously being supplied to the motor(s) of the drone's propulsion system(s). In some embodiments, the noise reduction results in at least substantial cancellation of the propulsion system noise signature of the drone from a noisy audio signal captured by the drone.

FIG. 1 is a diagram of a system (100) for modeling noise emanating from a drone's propulsion system set (including at least one propulsion system, each propulsion system including a propeller and an electric motor which drives the propeller in response to a supplied voltage) and reducing (e.g., canceling) propulsion system noise from an audio signal captured by the drone using the resulting modeled noise, in accordance with some example embodiments. In a typical implementation, the drone's propulsion system set includes four propulsion systems (identified by reference numerals 1, 2, 3, and 4 in FIG. 1). Each propulsion system includes an electric motor, which may be but need not be a brushless motor, and a propeller coupled to the motor and configured to be driven independently by the motor. The drone also includes a subsystem 90 (sometimes referred to herein as a drone controller) which implements (includes) a microphone set 91 (comprising one or more microphones) and a wireless transmission system 92. Wireless transmission system 92 is coupled and configured to generate and transmit an audio signal captured by microphone set 91, and at least one propulsion voltage signal (e.g., the signal identified as "Voltage 1 . . . 4" in FIG. 1) indicative of the voltage instantaneously being supplied to each motor of the propulsion system set. In some embodiments, the propulsion voltage signal is one channel of a multichannel signal which includes at least one other channel indicative of the audio signal.

The technique implemented by system 100 of FIG. 1 employs a real-time power (applied voltage) profile corresponding to each propulsion system of the drone to drive noise modeling (e.g., to determine a database of modeled drone propulsion system noise, including a modeled version of noise emitted from each propulsion system in response to each of a number of different voltages applied to the propulsion system's motor), and the reduction (partial or at least substantially complete cancellation) of drone noise (motor plus propeller noise) from an audio signal captured by and transmitted from the drone.

More specifically, processing system 101 of FIG. 1 (which is external to, and typically located remotely from, the drone of FIG. 1) includes wireless receiver 102. Wireless receiver 102 is coupled (typically, remotely coupled) to wireless transmission system 92 of drone controller 90 of the drone. Wireless receiver 102 is configured to receive the audio signal and each said propulsion voltage signal transmitted by the drone, and to parse the received signals to identify: voltage data indicative of the voltage instantaneously being supplied to each motor of the drone's propulsion system set; and audio data indicative of the audio signal transmitted by the drone. Typically, the audio signal is a channel set (of one or more channels) of a multichannel signal transmitted by the drone (such that the channel set is indicative of the audio data), and the propulsion voltage signal is another channel of the multichannel signal which is indicative of the voltage data).

In various embodiments of the invention, the processing performed by processing system 101 of FIG. 1 can be performed onboard the drone which generates the audio signal to undergo noise reduction, or at a remote server, or on another drone. In the deployment scenario where the processing is performed on a remote server or on another drone wireless it will be appreciated by those skilled in the art that wireless receiver 102 could be a transceiver, a universal asynchronous receiver/transmitter (UART) or any other radio frequency transceiver.

Further, wireless receiver 102 is coupled and configured to assert the audio data to noise reduction subsystem 104 of system 101, and to assert the voltage data to a noise modeling subsystem 103 of system 101. Noise modeling subsystem 103 implements a model of noise emitted by each propulsion system of the drone as driven by each voltage in a range of voltages. In some example embodiments, noise modeling subsystem 103 may be or include a tangible, non-transitory memory which implements non-transitory storage of data implementing the noise model, and subsystem 103 is also configured to assert control data to subsystem 104 in response to each set of voltage data asserted by wireless receiver 102. In such a typical implementation, subsystem 103 stores a database of modeled drone propulsion system noise, including a modeled version of noise emitted from each propulsion system in response to each of a number of different voltages applied to the propulsion system's motor.

In some example implementations, subsystem 103 stores a database of modeled drone propulsion system noise (modeled noise as a function of voltage, implementing a corresponding noise model). The database can be pre-programmed or pre-stored, and includes modeled noise (as a function of voltage) for the specific propulsion system set whose noise is to be reduced, although it may include modeled noise as a function of voltage pertaining to propulsion systems of types other than those included in a specific drone of interest (whose captured audio is to undergo noise reduction) and also to the types of propulsion systems included in the drone of interest. In operation, subsystem 103 would be configured (e.g., initialized) to correlate each stream of voltage data (for one of the propulsion systems of a drone of interest) with the corresponding subset of the modeled noise data of the full database stored in subsystem 103. If the full database also includes additional modeled noise data for propulsion systems of types not included in the propulsion system set of the drone of interest, such additional modeled noise data is not used to perform noise reduction on the audio captured by the drone of interest.

In operation, subsystem 104 uses control data generated by subsystem 103 (in accordance with the noise model implemented by subsystem 103) in response to the voltage data, to perform noise reduction on the audio data. More specifically, in response to each subset of the voltage data indicative of instantaneous voltage supplied to each motor of the propulsion system set of the drone, subsystem 103 generates (in accordance with the noise model) and asserts (to subsystem 104) control data indicative of noise reduction to be performed by subsystem 104 on the corresponding segment of the audio signal (e.g., on audio data indicative of noisy audio captured by the drone during operation of the propulsion system set in response to the instantaneous voltage(s)), to reduce (e.g., cancel) propulsion system noise from the segment of the audio signal, thereby generating clean audio data (e.g., a clean audio signal indicative of a noise-reduced version of the segment of the captured audio signal). Typically, the noise reduction reduces (partially or at least substantially completely cancels) from the audio content (indicated by the audio data) harmonic (tonal) components of the propulsion system noise, in accordance with the noise model. Optionally also, the noise reduction reduces (partially or at least substantially completely cancels) residual noise from the audio content (where the residual noise is an expression determined by the noise model of non-harmonic spectral components of the propulsion system noise) and/or reduces other noise from the audio content.

In some embodiments, the noise model is determined as follows. Noise data is generated and recorded, where the noise data is indicative of noise emitted by at least one drone propulsion system including an electric motor, as a function of voltage supplied to the electric motor. The noise data is indicative of propulsion system noise emitted (by each type of propulsion system which is contemplated for use on a drone to be used to capture audio of interest) and captured by a microphone or microphone set (of each type which is contemplated for use on the drone to be used to capture audio), as a function of voltage (in the range of voltages expected to be supplied to the electric motor of each propulsion system during audio capture). The noise data is provided to a programmed processor (e.g., implemented by processing system 101), and the processor generates the model of noise in response to the noise data (e.g., in a manner to be described below).

In a typical implementation, system 101 of FIG. 1 accomplishes noise reduction by removing (in subsystem 104) modeled noise from (e.g., subtracting the modeled noise from, or applying a cancellation signal, determined from the modeled noise, to) a noisy audio signal received (from a drone) at wireless receiver 102, using a predetermined database of modeled noise (stored in subsystem 103), and knowledge (indicated by voltage data from the drone, which voltage data is asserted to subsystem 103 via wireless receiver 102) of the voltage instantaneously being supplied to each propulsion system of the drone whose noise is modeled. In some example embodiments, the technique implemented by system 100 of FIG. 1 can include or employ additional noise reduction or cancellation techniques or devices. Examples of such additional noise reduction or cancellation techniques or devices include (but are not limited to) microphone array beamforming (and cancellation of noise from each drone of a set of two or more drones employed to implement a microphone array), or wind noise reduction techniques or devices.

Performance of noise reduction (in accordance with embodiments of the invention) on a noisy audio signal captured by one or more microphones on a drone may occur either on board the drone (e.g., a drone configured as in FIG. 4), in which case a clean microphone feed is transmitted from the drone, or at a remote location (e.g., as in the FIG. 1 embodiment). In some example embodiments, noise cancellation may result from aggregated data (indicative of a combination or aggregate of noise emitted by the propulsion system(s) of each of several drones) in order to cancel noise from several drones.

Figure 1A:
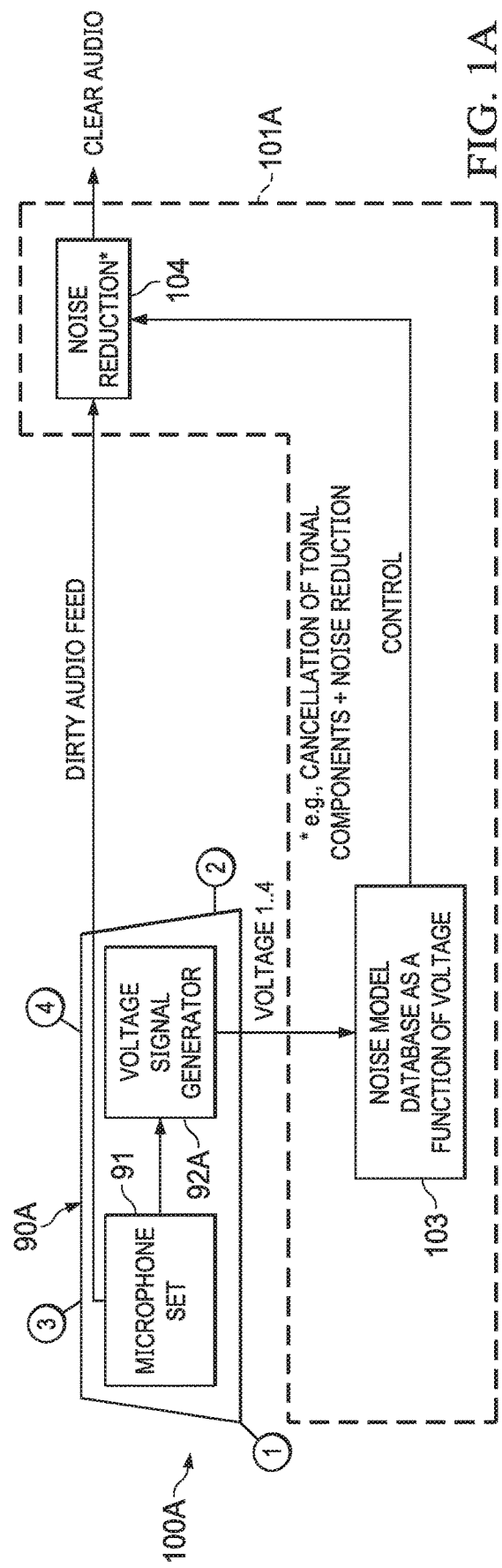
FIG. 1A illustrates a system for modeling noise emanating from a drone's propulsion systems (e.g., motors and propellers) and performing noise reduction (e.g., to cancel the noise) on audio captured by the drone, in accordance with some example embodiments.

FIG. 1A is a block diagram of drone configured to capture audio and perform noise reduction on the captured audio in accordance with example embodiments disclosed herein. The drone of FIG. 1A is identical to the drone of system 100 of FIG. 1 (and each element of FIG. 1A which is identical to a corresponding element of FIG. 1 are identified by identical reference numbers in FIGS. 1 and 1A), except in the following respects:

subsystem 101A of the drone of FIG. 1A is identical to processing system 101 of FIG. 1 except in that subsystem 101A lacks a wireless receiver;

subsystem 90A of the drone of FIG. 1A is identical to subsystem of 90 of the drone of FIG. 1 except in that subsystem 90A lacks a wireless transmitter, and in that subsystem 90A includes propulsion voltage signal generation subsystem 92A configured to generate at least one propulsion voltage signal (e.g., the signal identified as "Voltage 1 . . . 4" in FIG. 1A) indicative of voltage data, where the voltage data is indicative of the voltage instantaneously being supplied to each motor of the drone's propulsion system set. Each propulsion voltage signal is supplied from subsystem 92A to subsystem 103, and subsystem 103 is configured to operate in response to the voltage data indicated thereby; and the audio signal captured by microphone set 91 is supplied, from system 91, to subsystem 104, Subsystem 104 is configured to perform noise reduction on the noisy audio data indicated by the audio signal.

The drone of FIG. 1A typically also includes other elements not shown in FIG. 1A (e.g., a housing, and a wireless transmission subsystem configured to transmit an audio signal indicative of the output of subsystem 104).

Figure 4:
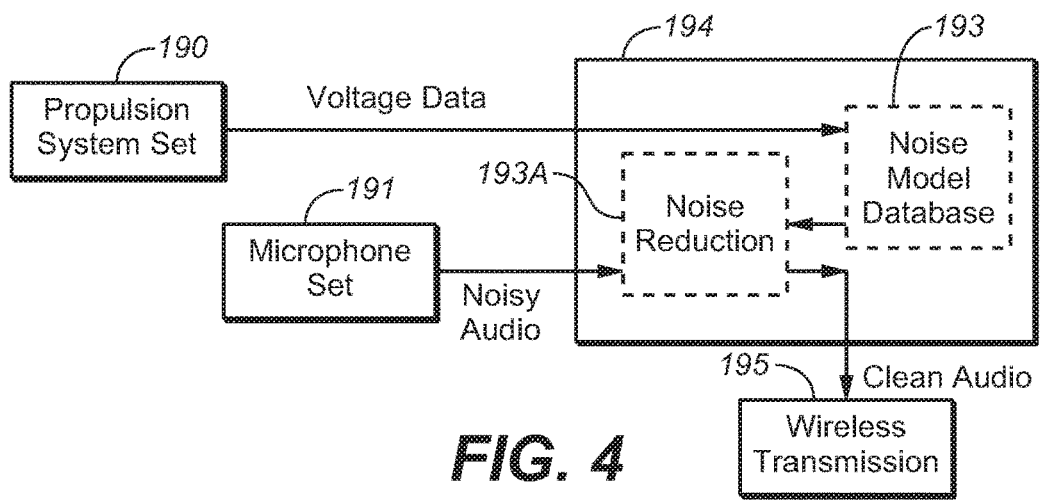
FIG. 4 is a simplified block diagram of a drone configured to capture audio and perform noise reduction on the captured audio in accordance with example embodiments.

FIG. 4 is a block diagram of a drone configured to capture audio and perform noise reduction on the captured audio in accordance with example embodiments disclosed herein. The drone of FIG. 4 includes propulsion system set 190 (including one or more propulsion systems, each including an electric motor), microphone set 191 (comprising one or more microphones), noise reduction subsystem 194, and wireless transmission subsystem 195, coupled as shown, and typically also includes other elements (e.g., a housing) not shown in FIG. 4.

Propulsion system set 190 is configured to generate (and assert to subsystem 194) voltage data indicative of the voltage instantaneously being supplied to each motor of the propulsion system set. Microphone set 191 is configured to generate (and assert to subsystem 194) audio data indicative of a captured audio signal, which is in turn indicative of audio of interest captured during operation of propulsion system set 190. Subsystem 194 includes noise model subsystem 193 and noise cancelling subsystem 193A. Subsystem 193 implements a model of noise (predetermined in accordance with an embodiment of the invention) emitted by each propulsion system of set 190 as driven by each voltage in a range of voltages, and may be configured as is subsystem 103 of FIG. 1.

Subsystem 193 is configured to implement the model of noise ("noise model"), and to generate (and assert to subsystem 193A of subsystem 194) control data (in accordance with the noise model) in response to each set of voltage data received from propulsion system set 190. In operation, subsystem 193A uses the control data to perform noise reduction on the audio data generated by microphone set 191. More specifically, in response to each subset of the voltage data indicative of instantaneous voltage supplied to each motor of the propulsion system set 190, subsystem 193 generates and asserts to subsystem 193A (in accordance with the noise model) control data which determines the noise reduction to be performed by subsystem 193A on the corresponding segment of the captured audio signal (i.e., the audio data captured during operation of propulsion system set 190 in response to the instantaneous voltage(s)). In response to the control data, subsystem 193A reduces (at least partially cancels) propulsion system noise from the segment of the audio signal, thereby generating clean audio data. The clean audio data generated by subsystem 193A in response to the control data is indicative of a noise-reduced version of each corresponding segment of the captured audio signal. The clean audio data is asserted from subsystem 194 to wireless transmission subsystem 195.

Wireless transmission subsystem 195 is coupled and configured to generate (in response to the clean audio data generated in subsystem 194) a noise-reduced version of the audio signal captured by microphone set 191, and to transmit the noise-reduced version of the audio signal.

Noise modeling in accordance with a class of embodiments includes the following procedures. A first step is to record a database of noise signals (motor plus propeller noise) which emanate from at least one drone propulsion system (including a motor and at least one propeller), and typically from each of a number of different drone propulsion systems (i.e., drone propulsion systems of different model types), to at least one microphone, and typically to each of a number of different microphones (e.g., microphones of different model types whose use in drones is contemplated). Preferably, for each combination of a drone propulsion system and a microphone which captures sound emitted by the propulsion system, noise signals are recorded while the drone motor is driven by each voltage of a set of voltages (which span the full range of voltages which may supplied to the drone motor, to drive the motor, during drone operation), so that one noise signal is recorded for each driving voltage (V) in the set. This first step is typically conducted in a controlled acoustical environment such as, for example, an anechoic chamber. A second step is or includes generating a parametric model of each recorded noise signal (each corresponding to a different microphone/propulsion system pair driven by a specific voltage) as a function of the voltage supplied to the relevant propulsion system (e.g., as a function of voltage in the full range of voltages which may be supplied to the motor of the propulsion system during drone operation).

For example, for a propulsion system set of M propulsion systems mountable on a drone, where M is positive integer, each propulsion system of the set comprising a motor and a propeller driven by the motor, and a microphone set (e.g., one microphone) for capturing sound (referred to as noise) emitted by each propulsion system of the propulsion system set, the noise emitted by the propulsion system set (driven by a specific voltage supplied to each motor of the propulsion system set) and captured by the microphone set is as shown below in Equation 1:

$$N(v_1, \ldots, v_M) = \text{Sum\_props } N_i(v_i) \qquad \text{(Equation 1)}$$

In Equation 1, noise $N_i(v_i)$ is the sound emitted by the "i"th propulsion system of the set (and captured by the microphone set) while driven by a voltage $v_i$ being supplied to its motor, and the sum is over all M of the propulsion systems of the set. Thus, the noise $N(v_1, \ldots, v_M)$ is the sum of the captured sound emitted by the M propulsion systems of the set while the motors of the set are driven by voltages $v_i$ (i.e., with the motor of the "i"th propulsion system of the set being driven by voltage $v_i$). Typically, each of the voltages supplied to each motor of the propulsion system set is varied over its range, and a noise value $N(v_1, \ldots, v_M)$ is recorded for each combination of voltages supplied to the motor(s) of the propulsion system set.

In a typical implementation, a parametric model of the type shown in Equation 2 is generated (for each propulsion system of the set, and for each driving voltage supplied to the motor of each such propulsion system) to model the noise emitted by the propulsion system of the set while driven by the voltage. More specifically, each parametric model is a model of the type shown in Equation 2 of the noise, $N_i$, emitted by the "i"th propulsion system of the set as a function of time, t, while driven by voltage $v_i$:

$$N_i(v_i,t)=[\text{Sum\_k } (g_{ik}*\sin(2\pi(k+1)*f_{i0}*t+\theta_i)]+n_i(t) \quad \text{(Equation 2)}$$

In Equation 2, frequency $f_{i0}$ is a base (or fundamental) frequency of the harmonic components of the sound emitted by the "i"th propulsion system of the set driven by voltage $v_i$, phase $\theta_i$ is a phase for such sound, k is an index whose range is determined so that the range of frequencies $2\pi f_{i0}$ through $2\pi(k+1)f_{i0}$ is sufficient for the sum in brackets to characterize a frequency domain representation of the harmonic components of the sound, and $n_i(t)$ is residual noise. More specifically, the residual noise, $n_i(t)$ is an expression of the non-harmonic spectral components of the sound emitted by the propulsion system. In some implementations, the residual noise term, $n_i(t)$, is omitted from the parametric model.

If modeled as shown in Equation 2, the noise $N_i(v_i,t)$ emitted by the "i"th propulsion system at time t (while driven by voltage $v_i$) is a sum of a residual noise, $n_i(t)$, and a sum (over a range of values of the index k, and weighted by a gain $g_{ik}$ for each value of the index k) of harmonic spectral components (each having a frequency which is a multiple of a base frequency $f_{i0}$, and a phase $\theta_i$).

The modeled residual noise, $n_i(t)$, for use in cancelling non-harmonic propulsion system noise from audio captured by a drone, can be determined using techniques of types that will be apparent to those of ordinary skill in the art given the present disclosure, (e.g., conventional spectral subtraction techniques). For example, in some cases it may be appropriate to determine the residual noise, $n_i(t)$, using spectral subtraction techniques as described in the paper, Y. Ephraim and D. Malah, "Speech Enhancement Using a Minimum Mean-Square Error Short-Time Spectral Amplitude Estimator," IEEE Trans. on Acoustics, Speech and Signal, December 1984, No. 6, Vol. ASSP-32, pages 1109-1121, the contents of which are incorporated herein in its entirety by reference. In some example embodiments, the target noise spectrum is varied as a function of the time-dependent voltage information.

The modeled harmonic propulsion system noise of Equation 2 (i.e., $[\text{Sum\_k } (g_{ik}*\sin(2\pi(k+1)*f_{i0}*t+\theta_i)])$ is for use in cancelling harmonic components of propulsion system noise from audio captured by a drone, e.g., by subtracting noise having the fundamental frequency $f_{i0}$(and harmonics thereof) emitted by the "i"th propulsion system of the drone at time t (while driven by voltage $v_i$), as a function of the time-dependent voltage supplied to such propulsion system.

An example of a method for determining the modeled harmonic propulsion system noise implements an optimization loop as follows to refine an initially determined harmonic propulsion system noise model of form shown in Equation 2 (i.e., $[\text{Sum\_k } (g_{ik}*\sin(2\pi(k+1)*f_{i0}*t+\theta_i)])$. In the example, the "source signal" ("s(t)") is the noise signal emitted by the "i"th propulsion system at time t (while driven by voltage $v_i$), which is typically a pre-recorded signal available by accessing a noise database. The optimization is performed in accordance with the following pseudocode:

--- transform the source signal, s(t), into the frequency domain (e.g., using a Fast Fourier Transform) to generate frequency components, S(f);
  determine initial choices of $f_{i0}$ and $\theta_i$ and $g_{i0}$ from the frequency components, S(f);
  for each value of the integer index k in the interval from 1 through K* $f_{i0}$ (where K is the audio bandwidth of the source signal, divided by $f_{i0}$) repeat the following steps to determine an optimized value, $f_k$, of each of the initially determined frequencies $(k+1)*f_{i0}$:
  {
  Locate spectral maxima $M(f_k)$ in a given window (e.g., +/− 10Hz) around the expected harmonic frequency $(k+1)*f_{i0}$, where $f_k$ is the frequency corresponding to the local maximum for index k;
  Minimize energy of S'(f) = S(f) − || $M(f_k)$ || * sin $(2*\pi*f_k/SR + \text{Phi})$ over a quantized range of phase shifts Phi (e.g. equivalent to +/− 300 samples), where SR is the audio sampling rate. Another option is to use, as the value of each gain $g_{ik}$ in Equation 2, the gain $g_{ik}$ for the corresponding harmonic $(k+1)*f_{i0}$ as measured in controlled conditions during the first step of the process to generate the noise database;
  S(f) = S'(f)
  }.

---

In accordance with the pseudocode set forth above, the optimized values $||M(f_k)||$ are chosen to be optimized values of the gains $g_{ik}$ in Equation 2. Alternatively, the values of the gains $g_{ik}$ in Equation 2 can be chosen to be the $g_{ik}$ values originally present in the noise database, or the original $g_{ik}$ values can be optimized by identifying an optimal noise cancellation signal over a range of both phase shifts and gains (around the original $g_{ik}$ values from the noise database).

In some embodiments, harmonic spectral noise (of actually captured and recorded noise emitted from a propulsion system as a function of voltage supplied to the motor of the propulsion system) is modeled (e.g., by an optimized version of the harmonic noise model indicated in Equation 2) by determining the set of frequencies, gains and phase shifts leading to the maximum cancellation of (e.g., by subtraction of the modeled harmonic spectral noise from) the harmonic components in the captured and recorded noise. Optimization to generate a model of harmonic spectral noise may be carried out using a pre-recorded database of noise (e.g., noise $N(v_1, \ldots, v_M)$ of the type shown in Equation 1 above), where the pre-recorded database is indicative of noise emitted by each propulsion system (of a type mounted, or to be mounted, in a drone of interest) when each voltage of a set of voltages is being supplied to the motor of the propulsion system.

The modeled harmonic spectral noise (corresponding to each propulsion system of a drone having a specific drone propulsion system set and microphone set) can be removed from a noisy signal of interest (captured during operation of the drone) to cancel the harmonic spectral noise of the noisy signal of interest. Typically, a sequence of modeled versions of noise is removed from a sequence of segments of the noisy signal of interest, with each modeled version of noise removed from a segment of the noisy signal corresponding to a set of voltages instantaneously being supplied to the motor(s) of the propulsion system set of the drone whose noise is modeled (e.g., modeled as indicated in Equation 2).

The noise reduction (e.g., noise cancellation) applied to the noisy audio signal of interest captured by a microphone set (e.g., one microphone) of a drone can be carried out using model values (e.g., $f_{iO}$ and $g_{ik}$ as indicated in Equation 2) pre-stored in a database (e.g., implemented as a stored table) for each set of a sequence of sets of voltages instantaneously supplied to the motor(s) of the drone, assuming knowledge of the instantaneous voltage supplied to each motor of the drone.

The noise reduction (e.g., noise cancellation) process may be implemented on board the drone or at a remote location using information (including voltage information) sent back to a receiver (e.g., at the remote location) in a synchronized manner by, for example, wireless stereo audio transmission or the like. For example, one channel (e.g., a left channel) transmitted from the drone to the remote location may be designated as "dirty microphone feed" (indicative of an audio signal of interest in the presence of propulsion system noise to be canceled) and another channel (e.g., a right channel) transmitted from the drone to the remote location may be designated to contain the multiplexed digital signals indicative of the voltage feeds to each drone motor (which themselves are indicative of the noise to be canceled from the dirty microphone feed, assuming knowledge of the type of propulsion system set, and type of microphone set, of the drone).

The technique of canceling noise from multiple drones may for example include multiple applications of noise cancellation procedures (e.g., of the type described above) for the multiple paths (e.g., with each application of noise cancellation performed to cancel noise from a different one of the drones). The required time alignment may also be estimated, including by estimating the relative positions of the drones, for example using a camera-based tracking system, GPS tracking system or the like.

In some embodiments (e.g., implementations of specific example embodiments described herein), a set of drones may be operated as a remote multichannel microphone array. Each of the drones function as a different microphone of the microphone array, and noise reduction or cancellation in accordance with an example embodiment is performed on the noisy audio signal captured by each of the drones. In some such example embodiments, the microphone array (or one or more of the drones thereof) may be reconfigured dynamically based on motion tracking of one or more of the drones. For example, a drone may be tracked (e.g., using infrared optical cameras and reflecting targets).

Some embodiments (e.g., implementations of specific example embodiments described herein) may provide for camera and actor aware dialog recording. That is, the camera's pan/zoom/field of view (FOV) information may be combined with a drone's tracking information to optimize the drone position while maintaining it outside of the camera view frustum for recording dialog on, for example, movie, television sets and other scripted or non-scripted multimedia productions (e.g., sporting events).

Figure 2:
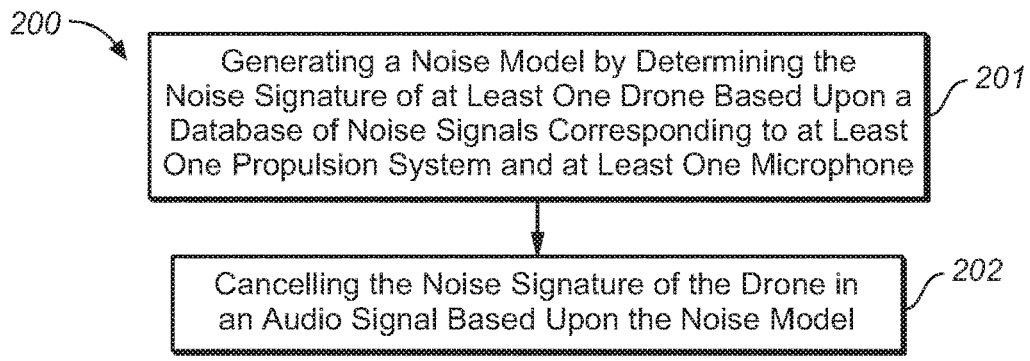
FIG. 2 is a flowchart of a method of modeling noise and canceling the noise in accordance with some example embodiments of the invention.

Other example embodiments include the steps of method 200 of FIG. 2. Method 200 includes a step (step 201) of generating a noise model indicative of the noise signature of at least one drone (i.e., the noise signature of a propulsion system set of each drone) as a function of voltage(s) supplied to the propulsion system set of each drone, based upon a database of propulsion system noise signals corresponding to at least one propulsion system and at least one microphone of each drone). Method 200 also includes a step (step 202) of using the noise model generated in step 201 to reduce (e.g., cancel) noise in an audio signal captured at a drone (e.g., of a type whose noise signature is modeled by the noise model) by at least partially canceling the noise signature of the drone based upon the noise model.

Figure 3:
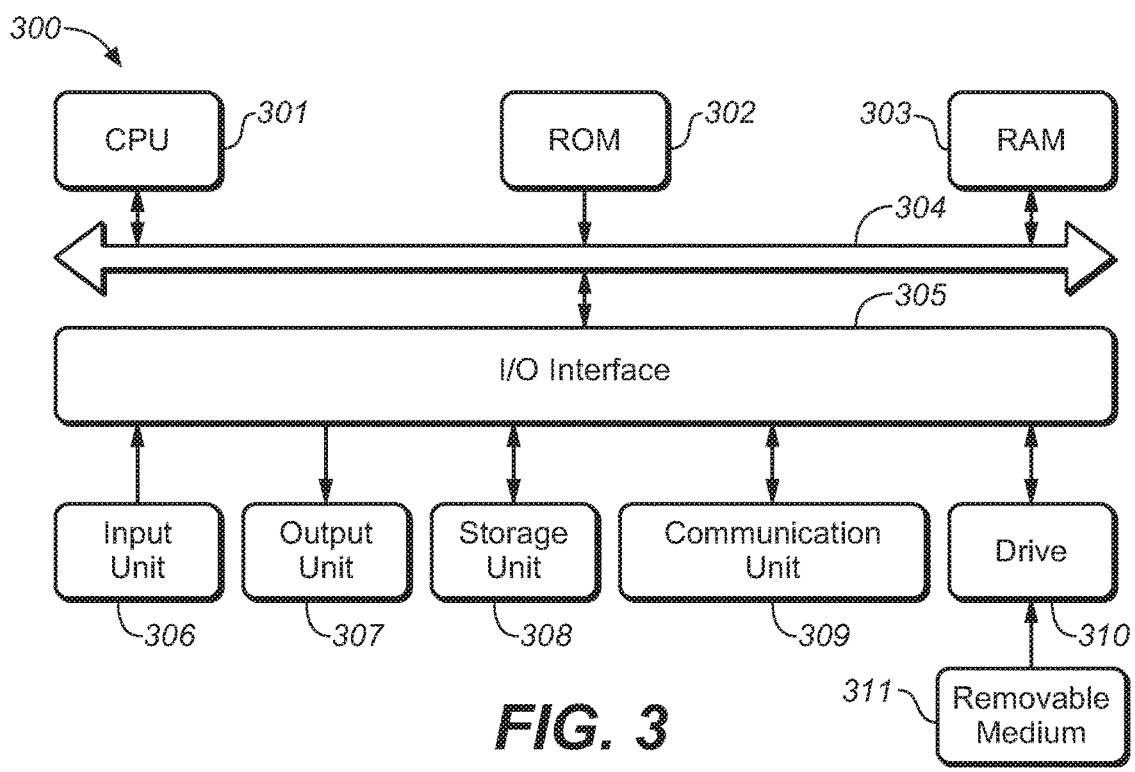
FIG. 3 is a simplified block diagram of an example computer system suitable for implementing the example embodiments described herein.

FIG. 3 depicts a block diagram of an example computer system 300 suitable for implementing embodiments of the present invention. As shown, the computer system 300 comprises a central processing unit (CPU) 301 which is capable of performing various processes in accordance with a program stored in a read only memory (ROM) 302 or a program loaded from a storage subsystem (section) 308 to a random access memory (RAM) 303. In RAM 303 (a tangible, non-transitory, computer readable, storage medium), the data required when the CPU 301 performs the various processes or the like is also stored (in tangible, non-transitory form) as required. For example, computer code for implementing noise reduction or cancellation in accordance with an embodiment of the invention may be stored (in tangible, non-transitory form) in RAM 303, using data indicative of a modeled drone noise database stored (in tangible, non-transitory form) in ROM 302 and/or in storage subsystem 308. The CPU 301, the ROM 302 and the RAM 303 are connected to one another via bus 304. An input/output (I/O) interface 305 is also connected to the bus 304. The following components are connected to the I/O interface 305: an input section 306 including a keyboard, a mouse, or the like; an output section 307 including a display (e.g., a cathode ray tube (CRT) or a liquid crystal display (LCD) and optionally also a loudspeaker or the like; the storage section 308 including at least one hard disk or other tangible storage medium; and a communication section 309 including a network interface card (e.g., a LAN card) and a modem or the like. The communication section 309 is configured to perform a communication process via a network. The network may for example, be a Global System for Mobile communications radio access network (GERAN), Global System for Mobile communications (GSM), Enhanced Data rates for GSM Evolution (EDGE), GSM EDGE (GERAN), a universal terrestrial radio access network (UTRAN), an evolved universal terrestrial radio access (eUTRAN) (e.g., long term evolution (LTE), LTE-Advanced (LTE-A, LTE-Beyond (LTE-B) or 4G/5G network), a first responder network authority (FirstNet) broadband network or other cellular networks employing Wideband Code Division Multiple Access (WCDMA), High Speed Packet Access (HSPA), a vehicle ad hoc network, other radio technologies such as IEEE 802.16 (e.g., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), and the like.

Also shown in FIG. 3 is a drive 310 which is also connected to the I/O interface 305 as required. A removable medium 311 (a magnetic disk, an optical disk, a magneto-optical disk, a semiconductor memory, or other tangible storage medium) is mounted on the drive 310 as required, so that a computer program (and/or modeled drone noise database) read therefrom is installed into the storage section 308 as required.

Specifically, in accordance with embodiments of the present invention, the processes described above with reference to FIG. 1 (or FIG. 2) may be implemented as or using computer software programs. For example, embodiments of the present invention comprise a computer program product including a computer program (and optionally also a modeled noise database) tangibly embodied on a machine readable medium, the computer program including program code (and optionally also a modeled noise database) for performing method 200 or a method performed by system 100. In such embodiments, the computer program may be downloaded and mounted from the network via the communication section 309, and/or installed from the removable medium 311.

Generally speaking, various example embodiments of the present invention may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example embodiments of the present invention are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in flowcharts may be viewed as method steps, and/or as operations that result from the operation of computer program code, and/or as a plurality of coupled logic circuit elements constructed to carry out the associated function(s). For example, embodiments of the present invention include a computer program product comprising a computer program tangibly embodied on a machine readable medium, the computer program containing program codes configured to carry out the methods as described above.

In the context of the disclosure, a machine readable medium may be any tangible medium that can contain, or store a program for use by or in connection with an instruction execution system, apparatus, or device. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present invention may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions/operations specified in the flowcharts and/or block diagrams to be implemented. The program code may be executed entirely on a computer, partly on the computer, as a stand-alone software package, partly on the computer and partly on a remote computer or entirely on the remote computer or server. The program code may be distributed on specially-programmed devices which may be generally referred to herein as "modules". Software component portions of the modules may be written in any computer language and may be a portion of a monolithic code base, or may be developed in more discrete code portions, such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. Further, it is well known to the skilled person that communication media typically embodies computer readable instructions, data structures, program modules or other data in a modulated data signal such as a carrier wave or other transport mechanism and includes any information delivery media.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination.

Various modifications and adaptations to the foregoing example embodiments of this invention may become apparent to those skilled in the relevant arts in view of the foregoing description, when it is read in conjunction with the accompanying drawings. Any and all modifications will still fall within the scope of the non-limiting and example embodiments of this invention. Furthermore, other embodiments of the inventions category forth herein will come to mind to one skilled in the art to which these embodiments of the invention pertain having the benefit of the teachings presented in the foregoing descriptions and the drawings.

Accordingly, the present invention may be embodied in any of the forms described herein. For example, the following enumerated example embodiments (EEEs) describe some structures, features, and functionalities of some aspects of the present invention.

EEE 1. A method, comprising steps of: generating a noise model, including by determining the noise signature of at least one drone having a propulsion system set, as a function of voltage supplied to the propulsion system set, based upon a database of noise signals corresponding to at least one propulsion system and at least one microphone; and canceling the noise signature of the drone in an audio signal based upon the noise model.

EEE 2. The method of EEE 1, wherein the step of generating a noise model comprises steps of: recording a database of noise signals, each of the noise signals representing noise emitted by at least one electric motor and at least one propeller coupled to the electric motor while a voltage is supplied to the electric motor, wherein the noise signals corresponding to each said electric motor include noise signals representing noise emitted while each voltage (V) of a set of voltages is supplied to the electric motor, said set of voltages extending across a voltage range; and generating a parametric model of the noise as a function of V.

EEE 3. The method of EEE 1, further comprising the step of microphone array beamforming and wind noise reduction.

EEE 4. The method of EEE 1, wherein the noise cancellation occurs on board the drone resulting in a clean microphone feed being transmitted to a remote location for further processing.

EEE 5. The method of EEE 1, wherein the noise cancellation occurs at a remote location using voltage information transmitted from the drone to the remote location.

EEE 6. The method of EEE 5, wherein one channel transmitted from the drone is designated a dirty microphone feed channel and another channel transmitted from the drone is designated to include a multiplexed digital signal for each of a voltage feed related to each drone propulsion system.

EEE 7. The method of EEE 5, wherein the remote location aggregates data in order to cancel noise from a plurality of drones.

EEE 8. The method of EEE 5, 6, or 7, wherein information (e.g., including voltage information) is transmitted back from the drones to the remote location in a wireless synchronized procedure.

EEE 9. The method of EEE 8, wherein the wireless synchronized procedure is repeated for multiple paths and a time alignment scheme is implemented including by estimating relative positions of the plurality of drones using a camera-based tracking system or global positioning satellite tracking system.

EEE 10. The method of EEE 9, wherein the drone or plurality of drones are reconfigured dynamically based on motion tracking and tracked using reflecting targets (and typically also cameras, e.g., infrared optical cameras).

EEE 11. The method of EEE 8, 9, or 10, wherein camera and actor aware dialog recording is employed to combine a camera's pan/zoom/field of view information with drone tracking to optimize recording a position outside of a camera view frustum for recording dialog on movie, television or multimedia sets.

EEE 12. The method of EEE 8, 9, or 10, wherein a flexible surround microphone array is created.

EEE 13. The method of EEE 1, wherein each propulsion system of the propulsion system set comprises at least one electric motor and at least one propeller.

EEE 14. A method for performing noise reduction on audio captured by a drone having a propulsion system set and a microphone set, the propulsion system set including at least one propulsion system, each said propulsion system including an electric motor, and the microphone set including at least one microphone, said method including steps of:
(a) providing voltage data indicative of instantaneous voltage supplied to each electric motor of the propulsion system set; and
(b) in response to the voltage data, using modeled noise to perform noise reduction on an audio signal captured by the microphone set of the drone, where the modeled noise is determined by a model of noise emitted by the propulsion system set as a function of instantaneous voltage supplied to said each motor of the propulsion system set.

EEE 15. The method of EEE 14, wherein step (a) includes steps of: receiving at a processing system at least one signal indicative of the voltage data; and parsing the at least one signal to identify said voltage data.

EEE 16. The method of EEE 14, also including a step of: receiving at a processing system a transmitted audio signal indicative of audio content and propulsion system noise captured by the microphone set, and a transmitted propulsion voltage signal indicative of the voltage data, and wherein step (b) includes a step of: at the processing system, using the modeled noise and the voltage data to perform noise reduction on the audio signal to cancel at least some of the propulsion system noise.

EEE 17. The method of EEE 16, wherein the transmitted audio signal is a multichannel signal, the propulsion voltage signal is one channel of the multichannel signal, and at least one other channel of the multichannel signal is indicative of the audio content and the propulsion system noise.

EEE 18. The method of EEE 14, wherein the voltage data is generated by a subsystem of the drone, and wherein step (b) is performed by another subsystem of the drone, thereby generating a noise-reduced audio signal, and also including a step of: transmitting the noise-reduced audio signal to a remotely located receiver.

EEE 19. The method of EEE 14, 15, 16, 17, or 18, also including steps of: providing noise data indicative of noise emitted by at least one drone propulsion system including an electric motor, as a function of voltage supplied to the electric motor; and generating the model of noise in response to the noise data.

EEE 20. The method of EEE 14, 15, 16, 17, or 18, also including steps of:
(c) recording noise signals indicative of noise emitted by at least one drone propulsion system including an electric motor, as a function of voltage supplied to the electric motor; and
(d) generating the model of noise in response to the noise signals, such that the model of noise is a parametric model indicative of noise emitted by each said drone propulsion system as a function of voltage supplied to the electric motor of the drone propulsion system.

EEE 21. The method of EEE 20, wherein the parametric model generated in step (d) includes a parametric model of each of the noise signals, and is indicative of harmonic spectral components of the model of said each of the noise signals.

EEE 22. The method of EEE 21, wherein the parametric model of each of the noise signals also includes an expression of non-harmonic spectral components of said each of the noise signals.

EEE 23. A noise reduction system configured to perform noise reduction on audio content captured by a drone, said drone having a propulsion system set and a microphone set, the propulsion system set including at least one propulsion system, each said propulsion system including an electric motor, and the microphone set including at least one microphone, said noise reduction system including: a noise model subsystem, coupled and configured to apply a model of noise emitted by the propulsion system set as a function of instantaneous voltage supplied to said each motor of the propulsion system set, to generate noise reduction control data in response to voltage data indicative of instantaneous voltage supplied to each electric motor of the propulsion system set; and a noise reduction subsystem, coupled and configured to perform noise reduction on audio data indicative of the audio content captured by the drone in response to the noise reduction control data, thereby generating a noise-reduced audio signal indicative of a version of the audio content from which drone propulsion system noise has been at least partially canceled.

EEE 24. The noise reduction system of EEE 23, including: a processing subsystem coupled to receive at least one signal indicative of the voltage data, and configured to parse the at least one signal to identify said voltage data.

EEE 25. The noise reduction system of EEE 23, including: a processing subsystem coupled and configured to receive at least one signal transmitted from the drone, wherein said at least one signal is indicative of the audio content and the voltage data, wherein the processing subsystem is configured to parse the at least one signal to identify said voltage data.

EEE. 26. The noise reduction system of EEE 25, wherein the at least one signal transmitted from the drone is a multichannel signal, one channel of the multichannel signal is
indicative of the voltage data, and at least one other channel of the multichannel signal is indicative of the audio content.

EEE 27. The noise reduction system of EEE 23, wherein said noise reduction system is a subsystem of the drone, and the propulsion system set is coupled and configured to assert the voltage data to said noise reduction system.

EEE 28. The noise reduction system of EEE 27, also including: a transmission system coupled and configured to transmit the noise-reduced audio signal to a remotely located receiver.

EEE 29. The noise reduction system of EEE 23, 24, 25, 26, 27, or 28, wherein the model of noise has been generated by: recording noise signals indicative of noise emitted by at least one drone propulsion system including an electric motor, as a function of voltage supplied to the electric motor; and generating said model of noise in response to the noise signals, such that the model of noise is a parametric model indicative of noise emitted by each said drone propulsion system as a function of voltage supplied to the electric motor of the drone propulsion system.

EEE 30. The noise reduction system of claim 29, wherein the parametric model includes a parametric model of each of the noise signals, and is indicative of harmonic spectral components of the model of said each of the noise signals.

EEE 31. The noise reduction system of claim 30, wherein the parametric model of each of the noise signals also includes an expression of non-harmonic spectral components of said each of the noise signals.

It will be appreciated that the embodiments of the invention are not to be limited to the specific embodiments disclosed and that modifications and other embodiments are intended to be included within the scope of the appended claims. Although specific terms are used herein, they are used in a generic and descriptive sense only, and not for purposes of limitation.

What is claimed is:
1. A method, comprising steps of:
    generating a noise model, including by determining a noise signature of at least one drone having a propulsion system set including at least one motor, as a function of voltage supplied to the propulsion system set, based upon a database of noise signals corresponding to at least one propulsion system and at least one microphone;
    providing, to a processing system, voltage data indicative of instantaneous voltage supplied to each motor of the propulsion system set; and
    in response to the voltage data, canceling the noise signature of the at least one drone in an audio signal based upon the noise model, wherein the noise model is indicative of noise emitted by the propulsion system set while each voltage set, of a sequence of voltage sets, is supplied to the propulsion system set.

2. The method of claim 1, wherein the step of generating the noise model comprises steps of:
    recording a database of noise signals, each of the noise signals representing noise emitted by at least one electric motor and at least one propeller coupled to the at least one electric motor while a voltage is supplied to the at least one electric motor, wherein the noise signals corresponding to the at least one electric motor include noise signals representing noise emitted while each voltage (V) of a set of voltages is supplied to the at least one electric motor, said set of voltages extending across a voltage range; and
    generating a parametric model of the noise as a function of the voltage V supplied to the at least one electric motor.

3. The method of claim 1, further comprising the step of: microphone array beamforming and wind noise reduction.

4. The method of claim 1, wherein the canceling of the noise signature of the at least one drone occurs on board the at least one drone resulting in a clean microphone feed being transmitted to a remote location for further processing.

5. The method of claim 1, wherein the canceling of the noise signature of the at least one drone occurs at a remote location using voltage information transmitted from the at least one drone to the remote location.

6. The method of claim 5, wherein one channel transmitted from the at least one drone is designated a dirty microphone feed channel and another channel transmitted from the at least one drone is designated to include a multiplexed digital signal indicative of at least one voltage feed to the propulsion system set.

7. The method of claim 5, wherein the remote location aggregates data in order to cancel noise from a plurality of drones.

8. The method of claim 5, wherein the voltage information is transmitted back from the at least one drones to the remote location in a wireless synchronized procedure.

9. The method of claim 8, wherein the at least one drone is or includes a plurality of drones, the wireless synchronized procedure is repeated for multiple paths and a time alignment scheme is implemented including by estimating relative positions of the plurality of drones using a camera-based tracking system or global positioning satellite tracking system.

10. The method of claim 9, wherein the plurality of drones are reconfigured dynamically based on motion tracking and tracked using reflecting targets.

11. The method of claim 8, wherein a flexible surround microphone array is created.

12. The method of claim 8, wherein camera and actor aware dialog recording is employed to combine a camera's pan/zoom/field of view information with drone tracking to optimize recording a position outside of a camera view frustum for recording dialog on movie, television or multimedia sets.

13. The method of claim 1, wherein each propulsion system of the propulsion system set comprises at least one electric motor and at least one propeller.

14. A computer program product comprising a computer-readable medium which is a non-transitory medium, and on which is stored instructions for performing the method of claim 13.

15. An apparatus, comprising:
   at least one processor; and
   at least one memory which is a non-transitory medium, and on which is stored a computer program,
   in which the at least one processor with the at least one memory on which is stored the computer program is configured to cause the apparatus to at least:
   generate a noise model of at least one drone based upon a database of noise signals corresponding to at least one propulsion system and at least one microphone, wherein the noise model is indicative of noise emitted by a propulsion system set of the at least one drone, as a function of voltage supplied to the propulsion system set, wherein the propulsion system set includes at least one motor; and
   in response to voltage data provided to the processor, cancel the noise signature of the at least one drone in an audio signal based upon the noise model, wherein the noise model is indicative of noise emitted by the propulsion system set while each voltage set, of a sequence of voltage sets, is supplied to the propulsion system set, and wherein the voltage data is indicative of instantaneous voltage supplied to each motor of the propulsion system set.

16. The apparatus of claim 15, wherein the propulsion system comprises at least one electric motor and at least one propeller.

17. An apparatus for use in at least one user equipment, comprising:
   circuitry adapted to cause the apparatus to at least:
   generate a noise model of at least one drone based upon a database of noise signals corresponding to at least one propulsion system and at least one microphone, wherein the noise model is indicative of noise emitted by a propulsion system set of the at least one drone, as a function of voltage supplied to the propulsion system set; and
   in response to voltage data provided to the circuitry, cancel the noise signature of the at least one drone in an audio signal based upon the noise model, wherein the noise model is indicative of noise emitted by the propulsion system set while each voltage set, of a sequence of voltage sets, is supplied to the propulsion system set, and wherein the voltage data is indicative of instantaneous voltage supplied to the propulsion system set.

18. The apparatus of claim 17, wherein the at least one propulsion system comprises at least one electric motor and at least one propeller.

19. A method for performing noise reduction on audio captured by a drone having a propulsion system set and a microphone set, the propulsion system set including at least one propulsion system, each said propulsion system including an electric motor, and the microphone set including at least one microphone, said method including steps of:
   providing voltage data indicative of instantaneous voltage supplied to each said electric motor of the propulsion system set; and
   in response to the voltage data, using modeled noise to perform noise reduction on an audio signal captured by the microphone set of the drone, where the modeled noise is determined by a model of noise emitted by the propulsion system set as a function of the instantaneous voltage supplied to each said electric motor of the propulsion system set, wherein the model of noise is indicative of noise emitted by the propulsion system set while each voltage set, of a sequence of voltage sets, is supplied to the propulsion system set.

20. The method of claim 19, wherein step of providing voltage data indicative of instantaneous voltage supplied to each said electric motor of the propulsion system set further includes steps of:
   receiving at a processing system at least one signal indicative of the voltage data; and
   parsing the at least one signal to identify said voltage data.

\* \* \* \* \*